United States Patent
Horesh et al.

(10) Patent No.: US 12,026,270 B2
(45) Date of Patent: Jul. 2, 2024

(54) SEED GENERATION FOR ELECTRONIC DATA PERTURBATION

(71) Applicant: Intuit Inc., Mountain View, CA (US)

(72) Inventors: Yair Horesh, Kfar-Saba (IL); Aviv Ben Arie, Ramat Gan (IL)

(73) Assignee: Intuit Inc., Mountain View, CA (US)

( * ) Notice: Subject to any disclaimer, the term of this patent is extended or adjusted under 35 U.S.C. 154(b) by 323 days.

(21) Appl. No.: 17/692,353

(22) Filed: Mar. 11, 2022

(65) Prior Publication Data
US 2023/0289458 A1 Sep. 14, 2023

(51) Int. Cl.
*G06F 21/62* (2013.01)

(52) U.S. Cl.
CPC ...... *G06F 21/6218* (2013.01); *G06F 21/6254* (2013.01)

(58) Field of Classification Search
CPC .. G06F 21/6218; G06F 21/6254; G06F 17/18; G06F 18/22; G06F 40/232; G06F 40/51; G06F 40/55; G06N 20/00; G06N 3/084; G06V 10/751; H04N 1/3217; H04N 19/147

See application file for complete search history.

(56) References Cited

U.S. PATENT DOCUMENTS

| | | | | |
|---|---|---|---|---|
| 6,360,019 | B1* | 3/2002 | Chaddha | H04N 19/147 375/E7.265 |
| 2006/0069919 | A1* | 3/2006 | Mihcak | H04N 1/3217 713/176 |
| 2012/0253783 | A1* | 10/2012 | Castelli | G06F 40/51 704/E11.001 |
| 2013/0030792 | A1* | 1/2013 | Zhao | G06F 40/55 704/E11.001 |
| 2020/0104357 | A1* | 4/2020 | Bellegarda | G06F 40/232 |
| 2020/0320224 | A1* | 10/2020 | Regensburger | G06F 17/18 |
| 2022/0053005 | A1* | 2/2022 | Liu | G06F 18/22 |
| 2022/0114399 | A1* | 4/2022 | Castiglione | G06V 10/751 |
| 2022/0383157 | A1* | 12/2022 | Dema | G06N 20/00 |
| 2023/0068386 | A1* | 3/2023 | Akdeniz | G06N 3/084 |

* cited by examiner

*Primary Examiner* — Le H Luu
(74) *Attorney, Agent, or Firm* — Paradice & Li LLP

(57) ABSTRACT

Described herein are example implementations for generating a perturbation seed for the perturbation of electronic data. A system obtains a plurality of datapoints (with one or more statistics calculated from the plurality of datapoints to be perturbed based on a perturbation seed). The system calculates one or more metrics from the plurality of datapoints. The system also generates, for each of the one or more metrics, a rounded metric by rounding the metric. The system further generates the perturbation seed. Generating the perturbation seed includes hashing the one or more rounded metrics. Rounding a metric may be to a defined place value (such as the second most significant place value), and a binary output of hashing the one or more rounded metrics may be converted to a number. The system may perturb one or more statistics based on the perturbation seed and output the one or more perturbed statistics.

18 Claims, 4 Drawing Sheets

SEED GENERATION FOR ELECTRONIC DATA PERTURBATION

TECHNICAL FIELD

This disclosure relates generally to the perturbation of electronic data, including the generation of a perturbation seed to be used for the perturbation of electronic data.

DESCRIPTION OF RELATED ART

Analysis of collected electronic data is performed by many individuals, businesses, and other institutions to obtain insights into various topics of interest. For example, the ages of individuals at marriage or other life events may be collected and analyzed to determine trends in such ages over time. In another example, the daily temperatures of a location may be tracked over years or decades and analyzed to determine trends in such temperatures over time. Such analysis may then be used to make further predictions (such as in age or temperature in the above examples) or to otherwise gain insights into the data.

Some data that is collected may be useful to be analyzed but may also be sensitive information that is to be obfuscated from entities wishing to receive analysis from such data. For example, determining an average annual income of a group of individuals may be useful information to indicate overall living standards of individuals or families. However, an individual may wish for his or her income to not be discoverable by another entity. The actual average income may also be sensitive information in that it could be used to derive individual income (such as for a small dataset being used to generate the statistic). As such, there is a need to protect sensitive information when analyzing such information and when generating statistics associated with such information.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a computer-implemented method for perturbing electronic data. The method includes obtaining a plurality of datapoints (with one or more statistics calculated from the plurality of datapoints to be perturbed based on a perturbation seed). The method also includes calculating one or more metrics from the plurality of datapoints. The method further includes generating, for each of the one or more metrics, a rounded metric by rounding the metric. The method also includes generating the perturbation seed. Generating the perturbation seed includes hashing the one or more rounded metrics. In some implementations, the method may also include calculating the one or more statistics from the plurality of datapoints, generating one or more perturbed statistics by perturbing the one or more statistics based on the perturbation seed, and outputting the one or more perturbed statistics. In some implementations, rounding a metric may be to a defined place value (such as the second most significant place value), and a binary output of hashing the one or more rounded metrics may be converted to a number.

Another innovative aspect of the subject matter described in this disclosure can be implemented in a system for perturbing electronic data. An example system includes one or more processors and a memory storing instructions that, when executed by the one or more processors, cause the system to perform operations. The operations include obtaining a plurality of datapoints (with one or more statistics calculated from the plurality of datapoints to be perturbed based on a perturbation seed). The operations also include calculating one or more metrics from the plurality of datapoints. The operations further include generating, for each of the one or more metrics, a rounded metric by rounding the metric. The operations also include generating the perturbation seed. Generating the perturbation seed includes hashing the one or more rounded metrics. In some implementations, the operations may also include calculating the one or more statistics from the plurality of datapoints, generating one or more perturbed statistics by perturbing the one or more statistics based on the perturbation seed, and outputting the one or more perturbed statistics. In some implementations, rounding a metric may be to a defined place value (such as the second most significant place value), and a binary output of hashing the one or more rounded metrics may be converted to a number.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
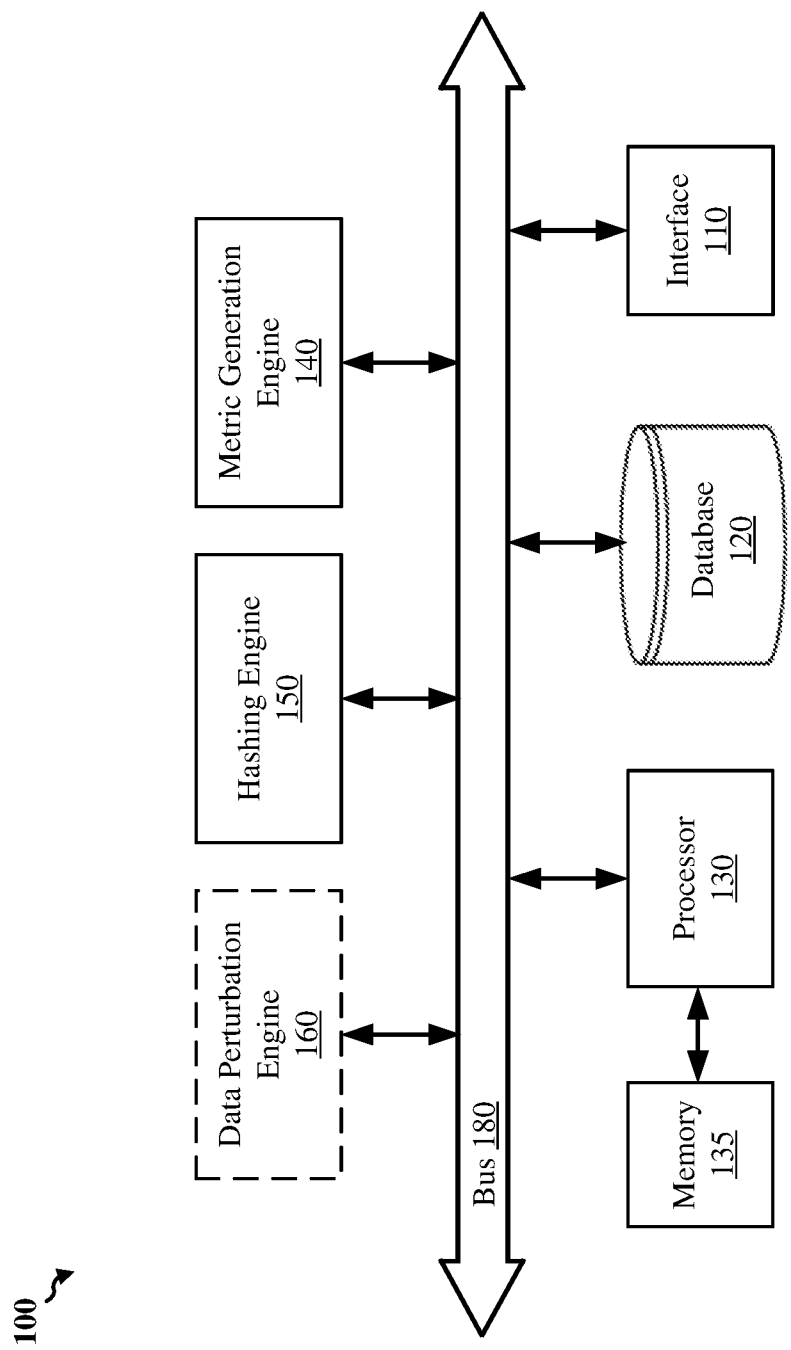
FIG. 1 shows an example computing system to generate a perturbation seed for perturbing electronic data, according to some implementations.

Implementations of the subject matter described in this disclosure may be used for the perturbation of electronic data. In particular, systems and methods are described to generate a perturbation seed to be used for the perturbation of electronic data.

Sensitive data or other data that a person or entity may wish to keep private may be analyzed to generate some statistic that may be of interest to others. For example, individual incomes (which each may be wished to be kept from being disclosed to others) may be averaged over a large population to determine an average income that may be of interest to others. In another example, sales figures by a small business (which is intended to be kept private by the business) may be averaged, aggregated, or otherwise analyzed with other business' sales figures to generate a statistic of interest to others (such as sales figures of a particular business sector).

While many aggregations of data inherently obfuscate the individual datapoints used to generate a final statistic, some aggregations may not sufficiently obfuscate the underlying datapoints from others receiving the final statistic. For example, if a company has ten employees, and a person wishes to know an average salary provided by the company, a system including the salaries of the ten employees may average the ten salaries to generate an average salary. While the average salary does not indicate each of the ten individual salaries, the average salary may provide information regarding the ten individual salaries. For example, if the same aggregation is performed after the company hires or loses an individual, the difference in averages can be used to determine the individual salary of the person hired or lost. As such, if care is not taken to protect data privacy and security in aggregating various statistics and summary information regarding a dataset, the statistics from such aggregations may cause a security breach of sensitive data.

A data security technique to allow others to ascertain summary information from sensitive data without the disclosure of such data to prevent a security breach includes data perturbation. As used herein, perturbation refers to the data security technique of adding noise to a dataset to obfuscate the real values of the dataset from people seeing the dataset or summaries generated from the dataset. Perturbing the dataset may include one or both of adding noise to the datapoints of the dataset or adding noise to the statistics generated from the datapoints of the dataset. An example data perturbation may include adding or subtracting a random or pseudorandom number to each datapoint or statistic (such as perturbing a datapoint or statistic to be anywhere between five percent less or five percent more than the actual value). For example, a normal distribution and a pseudorandom number generator may be used for each datapoint or statistic to determine a unique number to be added or subtracted from the datapoint or statistic.

If the datapoints of a dataset are perturbed each time a statistic is to be generated from the dataset or the statistics are perturbed each time a statistic is generated, the statistic varies each time the statistic is generated. If the type of noise for perturbation is consistent, while the statistic may vary each time the statistic is created, each instance of the varying statistic may still provide useful insight. For example, if a pseudorandom noise of up to plus or minus five percent is added to each datapoint, a median of the perturbed datapoints may differ each time the data is perturbed, but the median may still be within a tolerance of the actual median of the unperturbed datapoints. In another example, if a pseudorandom noise of up to plus or minus five percent is added to each statistic, each perturbed statistic may differ from the unperturbed statistic, but each perturbed statistic is within a tolerance of the unperturbed statistic. One problem with such perturbations is that the dataset may be subject to an attack based on consecutive requests for a statistic. For example, if a defined distribution of noise is added to the datapoints or statistics, a sufficient number of instances of a statistic could be used to cancel such noise. In a specific example, a normal distribution of noise may be added to the datapoints or to the created statistics to perturb the data. If an individual is able to obtain an average of the perturbed datapoints a thousand times (or more) or is able to obtain a thousand instances (or more) of perturbed averages of data, all of the obtained averages may be averaged together to cause the noise to be canceled in the overall average that is generated. As a result, the overall average based on the perturbed datapoints or statistics may be the same as an average generated from unperturbed data. The ability to use perturbed statistics to remove the perturbation may cause an unwanted disclosure of sensitive information regarding the data. As such, there is a need to better perturb data to prevent security breaches when analyzing a dataset (such as generating one or more statistics).

There exists various means to perturb data in a manner to better obfuscate the data as compared to the example perturbation means described above. However, such means require increasingly more processing resources and time in order to perturb the data. For example, instead of an unsecure perturbation requiring seconds or minutes for a dataset, a secure perturbation may require hours or more. As the datasets grow, the costs of such perturbation increase. As such, there is a need for stronger perturbation means that does not significantly increase required time or processing resources for performing the perturbation.

For the perturbation operations described herein, a defined algorithm may be used to perturb data (such as datapoints or statistics) based on a perturbation seed input to the algorithm. The perturbation may become more secure if the perturbation seed prevents the data being perturbed from being susceptible to consecutive request attacks. In addition to the perturbation becoming more secure, there is a need for the perturbation to remain consistent so that the generated statistics remain reliable in providing insights into the underlying data (while still protecting the underlying data).

Various implementations of the subject matter disclosed herein provide one or more technical solutions to the technical problem of the perturbation of data that is strong, consistent, and is not processing resource or time intensive. In particular, the subject matter disclosed herein provide one or more technical solutions to the generation of a perturbation seed for the perturbation of data. A computing system may be configured to obtain a plurality of datapoints of a dataset, with one or more statistics to be calculated from the plurality of datapoints and perturbed based on a perturbation seed. The perturbation seed may be generated based on one or more metrics calculated from the plurality of datapoints (such as the number of datapoints, the smallest or minimum datapoint, a specific quartile or percentile datapoint, the largest or maximum datapoint, or a median absolute deviation (MAD) of the datapoints). With the plurality of datapoints obtained by the computing system, the computing system may be configured to calculate the one or more metrics from the plurality of datapoints. The computing system may also generate, for each of the one or more metrics, a rounded metric (by rounding the metric, which may include rounding up, rounding down, or rounding to a closest defined significant digit). The computing system may further be configured to generate the perturbation seed. Generating the perturbation seed includes hashing the one or more rounded metrics, such as applying a security hash algorithm 3 (SHA-3) hashing algorithm to the one or more metrics. The perturbation seed may be a number that is a conversion from the binary output of the hashing algorithm. In some implementations, the computing system may also be configured to generate one or more statistics from the obtained datapoints, perturb the one or more statistics based on the perturbation seed, and outputting the one or more perturbed statistics.

Various aspects of the present disclosure provide a unique computing solution to a unique computing problem that did not exist prior to the analysis of electronic data and the need to perturb information regarding the electronic data. In addition, such analysis and perturbation of millions of datapoints in a satisfactory amount of time cannot be performed in the human mind, much less using pen and paper. For example, applying an SHA-3 hashing algorithm to hash metrics to generate a perturbation seed and then performing perturbation cannot be performed in the human mind, much less using pen and paper. As such, implementations of the subject matter disclosed herein are not an abstract idea such as organizing human activity or a mental process that can be performed in the human mind.

FIG. 1 shows an example system 100 to generate a perturbation seed for perturbing electronic data, according to some implementations. The system 100 includes an interface 110, a database 120, a processor 130, a memory 135 coupled to the processor 130, a metric generation engine 140, and a hashing engine 160. In some implementations, the system 100 may also include a data perturbation engine 160. In some implementations, the various components of the system 100 may be interconnected by at least a data bus 180, as depicted in the example of FIG. 1. In other implementations, the various components of the system 100 may be interconnected using other suitable signal routing resources.

The interface 110 may be one or more input/output (I/O) interfaces to obtain datapoints of one or more datasets or other information to be used by the system 100. The interface 110 may also provide a perturbation seed. If the system 100 is configured to perturb the data or one or more statistics generated from the data, the interface 110 may also provide the perturbed data or one or more statistics. If a different system is to perform the perturbation, the interface 110 may be coupled to the other system to provide the perturbation seed.

An example interface may include a wired interface or wireless interface to the internet or other means to communicably couple with other devices. For example, the interface 110 may include an interface with an ethernet cable or a wireless interface to a modem, which is used to communicate with an internet service provider (ISP) directing traffic to and from one or more user devices (such as a user's personal computer) or a computing system hosting datasets to be analyzed. If the interface 110 is to provide a perturbed data or statistic to a local user, the interface 110 may include a display, a speaker, a mouse, a keyboard, or other suitable input or output elements that allow the local user to interface with the system 100. If the interface 110 is to provide a perturbed data or statistic to a remote user, the interface 110 may couple to a user device to provide such perturbed data or statistic.

The database 120 may store the datapoints of one or more datasets. For example, a dataset may include datapoints of a previous year of income statements for a plurality of individuals of one or more companies. The database 120 may be configured so that the data is stored securely in the database 120, with users having no access to the datapoints without sufficient security credentials and procedures to ensure the security of the data.

The database 120 may also store any metrics generated, the hashing algorithm to be used, perturbation seeds generated, perturbed data or metrics, or other data for operation of the system 100. In some implementations, the database 120 may include a relational database capable of presenting data in tabular form and capable of manipulating the data using relational operators. The database 120 may use Structured Query Language (SQL) for querying and maintaining the database 120. While the examples herein depict operations to be performed by the system 100 for processing one dataset to generate one perturbation seed for clarity, the system 100 may be configured to process a plurality of datasets and to generate a plurality of perturbation seeds for a dataset. As such, the database 120 may be configured to maintain information for a plurality of datasets or requests for statistics from one or more datasets.

The processor 130 may include one or more suitable processors capable of executing scripts or instructions of one or more software programs stored in system 100 (such as within the memory 135). For example, the processor 130 may be capable of executing one or more applications, the metric generation engine 140, or the hashing engine 150. If the system 100 is to perturb data (such as one or more metrics to be provided for a dataset), the processor 130 may also be capable of executing the data perturbation engine 160. In some other implementations, the perturbation of data may be performed by another system, with the perturbation seed generated by the system 100 being provided to the other system.

The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processor 130 may include a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. For example, the memory 135 may store the one or more applications, the metric generation engine 140, or the hashing engine 150 that may be executed by the processor 130. If the system 100 also is to include the data perturbation engine 160, the memory 135 may store the data perturbation engine 160 that may be executed by the processor 130. The memory 135 may also store perturbation seeds generated, metrics generated, perturbed statistics generated, or any other data for operation of the system 100. In some implementations, hardwired circuitry may be used in place of, or in combination with, software instructions to implement aspects of the disclosure. As such, implementations of the subject matter disclosed herein are not limited to any specific combination of hardware circuitry and/or software.

Data (such as the datapoints or metrics generated from the datapoints) to be perturbed are perturbed using a perturbation algorithm and based on a perturbation seed. For example, if the system 100 is to perturb data (such as via the perturbation engine 160), an example algorithm may be used to generate a random number taken from a uniform distribution of a range of plus and minus the perturbation seed divided by 20 (e.g., noise=rand(|perturbation seed/20|). The system 100 is configured to generate the perturbation seed to be used to generate the noise. As shown in the above example, the algorithm is not too complex to cause difficulties in time or processing resources to perform a perturbation. The means to generate the perturbation seed, such as described herein, may also be configured to not cause a significant requirement in time and processing resources for computing systems. In some implementations, a perturbation seed is based on one or more metrics calculated from the datapoints, such as described below.

Figure 2:
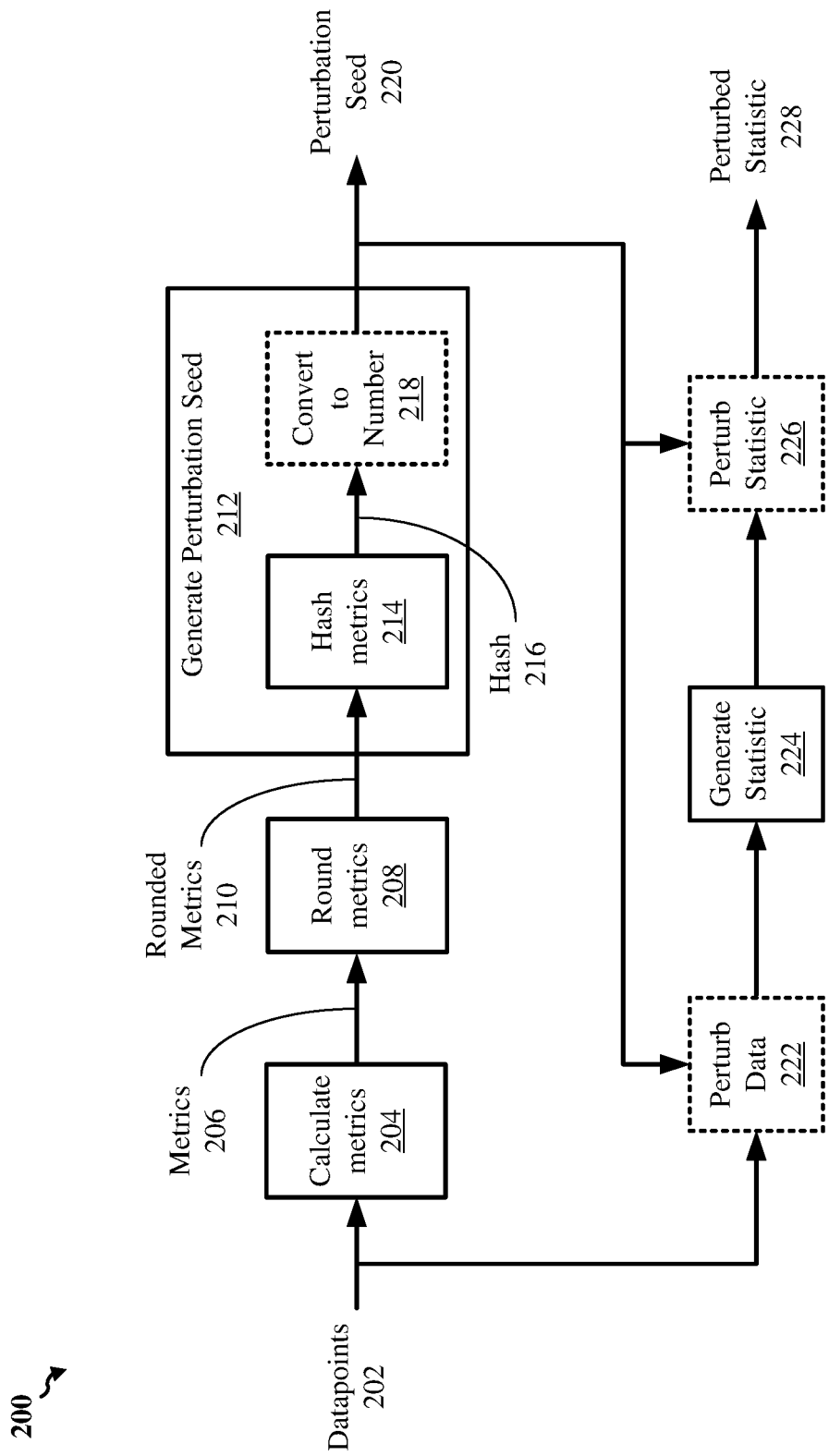
FIG. 2 shows an example process flow diagram depicting generating a perturbation seed from datapoints and generating a perturbed statistic, according to some implementations.

FIG. 2 shows an example process flow diagram 200 depicting generating a perturbation seed 220 from datapoints 202 and generating a perturbed statistic 228, according to some implementations. FIG. 2 is described in terms of being performed by the system 100 for clarity, but any suitable system may be used to perform the operations depicted in FIG. 2.

The datapoints 202 of a dataset (which may be obtained by the interface 110 of the system 100) are to be used to generated one or more metrics to be used to generate a perturbation seed 220. At 204, the system 100 calculates metrics 206 from the datapoints 202. At 208, the system 100 rounds the metrics 206 into rounded metrics 210.

Referring back to FIG. 1, the metric generation engine 140 generates and processes one or more metrics from a plurality of datapoints, with the one or more metrics to be used to generate a perturbation seed. For example, blocks 204 and 208 of FIG. 2 may be performed by the metric generation engine 140 of the system 100. The one or more metrics to be calculated may be any suitable metrics. Example metrics include, but are not limited to, one or more of the number of datapoints, the minimum or smallest datapoint, a first quartile datapoint (i.e., the datapoint at the 25 percent mark of the datapoints when sorting the datapoints from smallest to largest), a median datapoint, a third quartile datapoint (i.e., the datapoint at the 75 percent mark of the datapoints when sorting the datapoints from smallest to largest), the maximum or largest datapoint, or a median absolute deviation (MAD) of the plurality of datapoints. To note, determining the MAD of a dataset may include determining the median of the dataset, subtracting the median from each datapoint of the dataset and taking the absolute value of the result, and finding the median of the resulting absolute values. While some example metrics are provided, any suitable metric may be calculated, such as a different percentile (such as 90th percentile, 5th percentile, etc.), a mean or average, a standard deviation, a variance, and so on.

Such metrics may be calculated to any suitable number of decimal places or place values based on the capabilities of the computing system. The metric generation engine 140 may round a metric in any suitable manner so that the rounded metric is similar to the original metric but is not exactly the same as the original metric. In some implementations, the metric generation engine 140 may round a metric to a nearest defined place value n. For example, if k is 2, each metric may be rounded to the second place value, such as 0.43203 being rounded to 0.43, 1384.0023 being rounded to 1400, 83.42 being rounded to 83, and so on. To note, the place value k may be the same for all metrics or may differ between metrics. The place value k may be defined for a specific perturbation, may be user adjustable, or may be defined in any other suitable manner. While rounding to a nearest defined place value is described in the above example implementations, any suitable rounding operation may be implemented, such as rounding up or rounding down (or rounding to the closest number) to an integer, a decimal place, or in any other suitable manner. While FIG. 2 depicts calculating the metrics 204 and rounding the metrics 208 as separate operations, the system 100 (such as the metric generation engine 140) may be configured to perform both operations at the same time. For example, the metric generation engine 140 may be configured to calculate each metric to a specific number of place values so that the metric is already rounded.

Referring back to FIG. 2, at block 212, the system 100 generates a perturbation seed 220 from the one or more rounded metrics 210. Generating the perturbation seed at block 212 includes hashing the rounded metrics 210 (214) to generate a hash 216. Referring back to FIG. 1, the hashing engine 150 performs a hash on the one or more rounded metrics generated by the metric generation engine 140. The hashing engine 150 may be configured to use any suitable hashing algorithm. In some implementations, the hashing engine 150 is configured to use a secure hash algorithm 3 (SHA-3) hashing algorithm. However, any suitable hashing algorithm may be used, such as SHA-2 or a message digest (MD) 5 (MD5) algorithm, including SHA-1. To note, the hashing algorithm used may output any suitable number of bits as a result of the hash. For example, a SHA3-256 hashing algorithm may be used to hash the one or more metrics in order to generate a 256 bit output.

In some implementations, the hash 216 is already a number that may be used as the perturbation seed for perturbing data. In some implementations, though, the system 100 is to convert the binary values of the hash 216 into a number (218). The hashing engine 150 may be configured to convert a binary string output from hashing the one or more metrics into a number to be used as the perturbation seed. Any suitable conversion may be used, such as treating the bit sequence as a binary number and converting the binary number to a decimal number to be used as a decimal stream. In some implementations, the hash may be assumed to be a binary number to be used for perturbation (and thus no conversion may be required). To note, some hashing algorithms may require inputs of fixed length or of minimum length for hashing. For example, a hashing algorithm may require an input to be a minimum of 16 bytes. In some implementations, the hashing engine 150 may pad (such as zero-pad) the one or more metrics or otherwise manipulate the one or more metrics to ensure that the input requirements for the hashing algorithm are met. Also to note, the metrics to be input to the hashing algorithm may be input in any suitable order and in any suitable manner. For example, some hashing algorithms may be configured to allow all metrics to be input concurrently. However, some hashing algorithms may require a sequential input of the metrics for hashing (such as hashing two metrics, then hashing an output from the first hashing with a third metric, and so on). The order in which metrics are provided may be defined at the system 100 and in any suitable manner.

If the system 100 is to generate one or more perturbed statistics, the system 100 may include the data perturbation engine 160. The data perturbation engine 160 may generate one or more perturbed statistics, which may be output by the interface 110. For example, a perturbed statistic may be output to a display for a local user or may be output to another system for a remote user. Referring back to FIG. 2, the data perturbation engine 160 may generate a statistic 224. Perturbing the data in order to generate a perturbed statistic 228 may include one or both of perturbing the datapoints 202 used to generate a statistic (222) or perturbing the statistic after being generated (226). As noted above, any suitable perturbation means may be used based on the perturbation seed.

For each instance of a perturbation statistic 228 to be generated, a new perturbation seed 220 may be generated. For example, if the datapoints 202 remain static, block 212 for generating the perturbation seed may be repeated on the rounded metrics 210 to generate a new perturbation seed 220. Based on the hashing algorithm, the perturbation seed 220 may change each instance it is generated. The changes in the perturbation seed 220 thus causes the perturbed statistic to vary across instances of the same statistic being requested. To note, any suitable statistic may be requested and generated by the system 100 (or another suitable system). Example statistics to be generated may include, but are not limited to, an average, a standard deviation, a variance, or even a subset of the datapoints themselves. As such, the present disclosure is not limited to a specific type of statistic to be generated.

A dataset may change over time. For example, if a dataset is to include the last three months of daily datapoints, old datapoints may be dropped and new datapoints may be added as days pass. The system 100 may be configured to periodically obtain the updated sets datapoints and periodically generate the one or more rounded metrics based on changes to the sets of datapoints. For example, the rounded metrics may be updated nightly.

Referring back to FIG. 1, the components 140, 150, and 160 (if included) in system 100 may be implemented in hardware, software, or a combination of both hardware and software. In addition, while specific components are depicted for clarity in describing aspects of the present disclosure, the operations described herein may be performed using more or fewer components, using one, two, or more systems, or in other configurations not depicted herein. As such, while the examples described herein are with reference to being performed by the system 100 for clarity, the present disclosure is not limited to a specific system configuration to perform aspects of the present disclosure.

Figure 3:
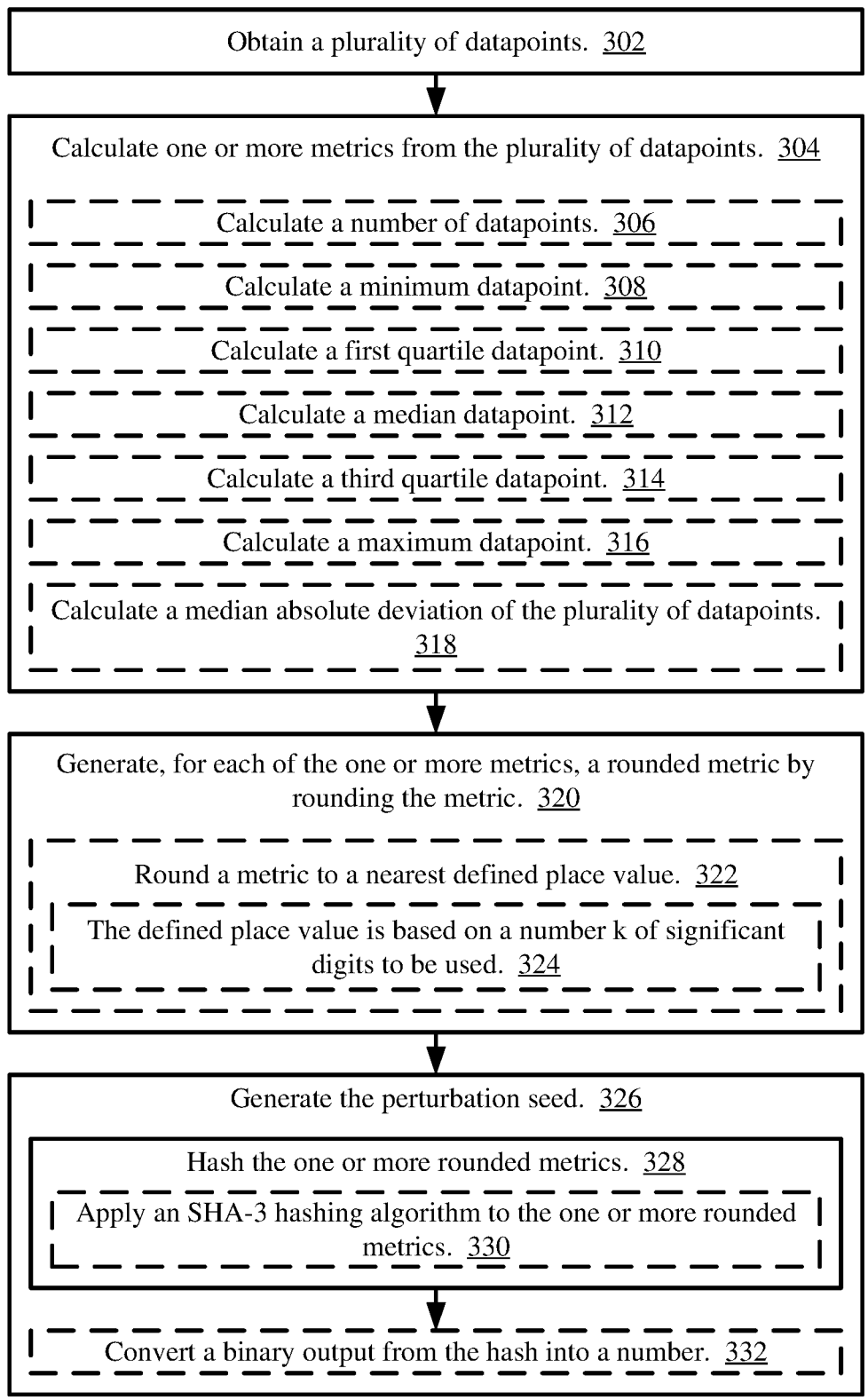
FIG. 3 shows an illustrative flow chart depicting an example process for generating a perturbation seed, according to some implementations.

FIG. 3 shows an illustrative flow chart depicting an example process 300 for generating a perturbation seed, according to some implementations. The process 300 is described as being performed by the system 100 for clarity, but any suitable system may be used.

At 302, the system 100 (such as the interface 110) obtains a plurality of datapoints. In some implementations, the system 100 obtains the datapoints when a statistic is requested. For example, a user may request an average of the datapoints of a dataset. The system 100 may attain the dataset from another system storing the dataset in response to receiving such request. In some other implementations, the system 100 may obtain the datapoints before a statistic is requested. For example, datapoints generated daily or at another period may be obtained by the system 100 when generated (such as by being generated by the system 100 or receiving from another system generating the datapoint). Additionally or alternatively, a dataset may be received during a batch import of one or more datasets from one or more other systems for storage in the database 120.

At 304, the system 100 (such as the metric generation engine 140) calculates one or more metrics from the plurality of datapoints. In some implementations, the system 100 calculates one or more of: the number of datapoints (306); the minimum (smallest) datapoint (308); the first quartile datapoint (310); the median datapoint (312); the third quartile datapoint (314); the maximum (largest) datapoint (316); or a MAD of the plurality of datapoints (318). In some implementations, the system 100 calculates each of the metrics described with reference to blocks 306-318, with all of the metrics being used to generate a perturbation seed. In some other implementations, only a subset of metrics may be calculated or other metrics may be calculated. While some example metrics are described herein, any suitable metrics may be calculated, such as a mean, a standard deviation, a different percentile, or even the datapoints themselves.

At 320, the system 100 (such as the metric generation engine 140) generates, for each of the one or more metrics, a rounded metric by rounding the metric. In some implementations, the system 100 may round the metric to a nearest defined place value (322). The defined place value may be based on a number k of significant digits to be used (324). For example, k may be 2, and each metric may be rounded to the second most significant place value of the metric (such as rounding 1873 to 1900 or rounding 0.59103 to 0.59). However, k may be any suitable integer and is not limited to 2. As noted above, rounding may be performed in any suitable manner, such as rounding up, rounding down, or rounding to a nearest number for a place value. To note, rounding is one means to add noise to help with obfuscating the data based on perturbation using a resulting perturbation seed.

At 326, the system 100 (such as the hashing engine 150) generates the perturbation seed from the one or more rounded metrics. Generating the perturbation seed includes hashing the one or more rounded metrics. In some implementations, the system 100 may apply a SHA-3 hashing algorithm to the one or more rounded metrics (330). For example, the system 100 may apply a SHA3-256, SHA3-512, or any other suitable variation of a SHA-3 hashing algorithm to the one or more rounded metrics. While some example hashing algorithms are depicted, any suitable hashing algorithm may be used. As noted above, metrics may be padded or otherwise adjusted to meet minimum sizes or required sizes for input to the hashing algorithm.

As noted above, the output of block 328 is a binary output (such as a string of 256 bits from the SHA3-256 algorithm being applied). In some implementations, the system 100 may convert the binary output from the hash into a number (332). For example, the binary output may be treated as a binary number or may be converted to a decimal in any suitable manner. A perturbation seed may be generated each instance that a request is received for a statistic. In this manner, the perturbation seed may change over time. In generating a new perturbation seed, block 326 may be repeated as needed. In some implementations, the system 100 may output the perturbation seed for use by another system to perturb the data (such as a system originally storing the dataset). Additionally or alternatively, the system 100 may be configured to perturb the data or otherwise generate a perturbed statistic.

Figure 4:
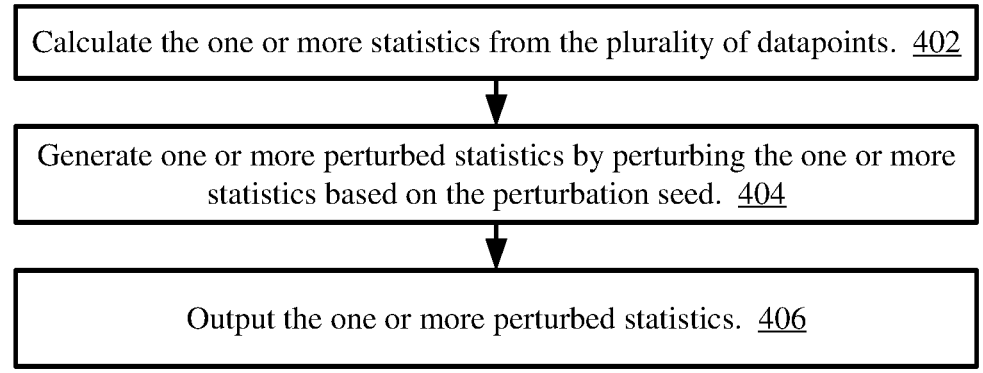
FIG. 4 shows an illustrative flow chart depicting an example process for perturbing electronic data using a generated perturbation seed, according to some implementations.

FIG. 4 shows an illustrative flow chart depicting an example process 400 for perturbing electronic data using a generated perturbation seed, according to some implementations. The process 400 is described as being performed by the system 100, but any suitable system may be used to perform the described operations. To note, example process 400 is an optional process that may not be performed by the system 100 if the system 100 is not to perturb the data or generate a statistic. As such, the system 100 is not required to perform the operations described herein with reference to FIG. 4.

At 402, the system 100 (such as the data perturbation engine 160) calculates the one or more statistics from the plurality of datapoints. As noted above, any suitable statistic may be calculated. In some implementations, a statistic is calculated based on a received request for the statistic. At 404, the system 100 (such as the data perturbation engine 160) generates one or more perturbed statistics by perturbing the one or more statistics based on the perturbation seed.

Perturbing the one or more statistics may include one or more of perturbing the datapoints before generating the statistic (such as depicted by block 222 in FIG. 2) or perturbing the statistic that is generated (such as depicted by block 226 in FIG. 2). As noted above, the perturbation algorithm or means may be configured to not require burdensome time or processing resources to execute.

At 406, the system 100 (such as the interface 110) outputs the one or more perturbed statistics. For example, the system 100 may display a perturbed statistic to a local user, or the system 100 may output the perturbed statistic to another system. Any number of perturbed statistics may be generated and output. While FIG. 4 depicts one flow of operations to generate perturbed statistics, the flow may be repeated many times and operations may be performed in any suitable order. For example, the system 100 may generate multiple instances of the same statistic before outputting the instances.

As described herein, systems and methods to generate a perturbation seed for the perturbation of electronic data are described. In using the described means to generate a perturbation seed (and thus perturb the data), perturbed statistics with consistent information useful to others may be obtained within suitable amounts of time while still keeping the underlying dataset secure. While example implementations are described above for clarity in disclosing aspects of the present disclosure, various modifications to the implementations described in this disclosure may be readily apparent to those skilled in the art, and the principles defined herein may be applied to other implementations without departing from the spirit or scope of this disclosure.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

If implemented in software, the functions may be stored on or transmitted over as one or more instructions or code on a computer readable medium. The processes of a method or algorithm disclosed herein may be implemented in a processor-executable software module which may reside on a computer readable medium. Computer readable media includes both computer storage media and communication media including any medium that can be enabled to transfer a computer program from one place to another. A storage media may be any available media that may be accessed by a computer. By way of example, and not limitation, such computer readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer readable media. Additionally, the operations of a method or algorithm may reside as one or any combination or set of codes and instructions on a machine readable medium and computer readable medium, which may be incorporated into a computer program product.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c. In addition, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation.

The claims presented herein are not intended to be limited to the implementations shown herein but are to be accorded the widest scope consistent with this disclosure, the principles, and the novel features disclosed herein.

What is claimed is:

1. A computer-implemented method for perturbing electronic data, comprising:
    obtaining a plurality of datapoints, wherein one or more statistics calculated from the plurality of datapoints are to be perturbed based on a perturbation seed;
    calculating one or more metrics from the plurality of datapoints;
    for each of the one or more metrics, generating a rounded metric by rounding the metric; and
    generating the perturbation seed, wherein generating the perturbation seed includes hashing the one or more rounded metrics.

2. The computer-implemented method of claim 1, further comprising:
    calculating the one or more statistics from the plurality of datapoints;
    generating one or more perturbed statistics by perturbing the one or more statistics based on the perturbation seed; and
    outputting the one or more perturbed statistics.

3. The computer-implemented method of claim 1, wherein calculating the one or more metrics includes calculating one or more of:
    a number of datapoints;
    a minimum datapoint;

a first quartile datapoint;
a median datapoint;
a third quartile datapoint;
a maximum datapoint; or
a median absolute deviation (MAD) of the plurality of datapoints.

4. The computer-implemented method of claim 1, wherein generating the perturbation seed also includes converting a binary output from hashing the one or more rounded metrics into a number to be used as the perturbation seed.

5. The computer-implemented method of claim 4, wherein hashing the one or more rounded metrics includes applying a secure hash algorithm 3 (SHA-3) hashing algorithm to the one or more rounded metrics.

6. The computer-implemented method of claim 1, wherein rounding a metric includes rounding the metric to a nearest defined place value.

7. The computer-implemented method of claim 6, wherein the defined place value is based on a number k of significant digits to be used.

8. The computer-implemented method of claim 7, wherein k equals 2.

9. The computer-implemented method of claim 7, wherein k is adjustable based on the number of datapoints in the plurality of datapoints.

10. A system for perturbing electronic data, comprising:
one or more processors; and
a memory storing instructions that, when executed by the one or more processors, causes the system to perform operations comprising:
obtaining a plurality of datapoints, wherein one or more statistics calculated from the plurality of datapoints are to be perturbed based on a perturbation seed;
calculating one or more metrics from the plurality of datapoints;
for each of the one or more metrics, generating a rounded metric by rounding the metric; and
generating the perturbation seed, wherein generating the perturbation seed includes hashing the one or more rounded metrics.

11. The system of claim 10, wherein the operations further comprise:
calculating the one or more statistics from the plurality of datapoints;
generating one or more perturbed statistics by perturbing the one or more statistics based on the perturbation seed; and
outputting the one or more perturbed statistics.

12. The system of claim 10, wherein calculating the one or more metrics includes calculating one or more of:
a number of datapoints;
a minimum datapoint;
a first quartile datapoint;
a median datapoint;
a third quartile datapoint;
a maximum datapoint; or
a median absolute deviation (MAD) of the plurality of datapoints.

13. The system of claim 10, wherein generating the perturbation seed also includes converting a binary output from hashing the one or more rounded metrics into a number to be used as the perturbation seed.

14. The system of claim 13, wherein hashing the one or more rounded metrics includes applying a secure hash algorithm 3 (SHA-3) hashing algorithm to the one or more rounded metrics.

15. The system of claim 10, wherein rounding a metric includes rounding the metric to a nearest defined place value.

16. The system of claim 15, wherein the defined place value is based on a number k of significant digits to be used.

17. The system of claim 16, wherein k equals 2.

18. The system of claim 16, wherein k is adjustable based on the number of datapoints in the plurality of datapoints.

* * * * *